United States Patent
Elbaccouch et al.

(10) Patent No.: US 12,485,380 B1
(45) Date of Patent: Dec. 2, 2025

(54) SYSTEMS AND METHODS FOR RECOVERY OF AMINE SOLVENT IN $CO_2$ CAPTURE PLANT

(71) Applicant: Schlumberger Technology Corporation, Sugar Land, TX (US)

(72) Inventors: Mohamed Elbaccouch, Sugar Land, TX (US); Sruthi Tadakamalla, Sugar Land, TX (US); Joseph Costandy, Sugar Land, TX (US); Abigail Mshelbwala, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 18/957,981

(22) Filed: Nov. 25, 2024

(51) Int. Cl.
| | |
|---|---|
| *B01D 53/14* | (2006.01) |
| *B01D 53/18* | (2006.01) |
| *B01D 53/62* | (2006.01) |
| *B01D 53/78* | (2006.01) |
| *B01D 53/96* | (2006.01) |

(52) U.S. Cl.
CPC ..... *B01D 53/1425* (2013.01); *B01D 53/1412* (2013.01); *B01D 53/1475* (2013.01); *B01D 53/18* (2013.01); *B01D 53/62* (2013.01); *B01D 53/78* (2013.01); *B01D 53/96* (2013.01); *B01D 2252/20436* (2013.01); *B01D 2257/504* (2013.01)

(58) Field of Classification Search
CPC ............ B01D 53/1425; B01D 53/1412; B01D 53/1475; B01D 53/18; B01D 53/62; B01D 53/78; B01D 53/96; B01D 2252/20436; B01D 2257/504
USPC ........................................................ 423/228
See application file for complete search history.

(56) References Cited

U.S. PATENT DOCUMENTS

2011/0308389 A1* 12/2011 Graff .................. B01D 53/1475
95/186

FOREIGN PATENT DOCUMENTS

WO  WO-2024158736 A2 *  8/2024

* cited by examiner

*Primary Examiner* — Anita Nassiri-Motlagh
(74) *Attorney, Agent, or Firm* — Jeffrey D. Frantz

(57) ABSTRACT

Provided herein is a system including a solvent-based carbon capture system, wherein the solvent-based carbon capture system includes an absorber configured to absorb carbon oxides ($CO_x$) from a gas flow into a solvent of a solvent flow to produce a treated gas flow. The system includes a regenerator configured to strip the carbon oxides from the solvent flow to produce a captured carbon oxides flow. The system further includes a wash system configured to wash the treated gas flow using water. The system also includes an appendix stripper system configured to separate a outflow stream into a reclaimed amine stream and a waste stream, wherein the outflow stream comprises the solvent and degraded components of the solvent, and the waste stream has a greater concentration of the degraded components than in the reclaimed amine stream.

19 Claims, 5 Drawing Sheets

SYSTEMS AND METHODS FOR RECOVERY OF AMINE SOLVENT IN $CO_2$ CAPTURE PLANT

BACKGROUND

The present disclosure generally relates to systems and methods for recovering amine solvent from post combustion systems associated with a carbon dioxide ($CO_2$) capture plant.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Industrial plants often combust hydrocarbon-containing materials, such as coal, oil, and natural gas, to generate heat and/or power for various equipment. However, due to growing environmental concerns, carbon capture processes (e.g., solvent-based) are implemented at industrial plants to reduce emissions (e.g., carbon dioxide ($CO_2$)) associated with the combustion process. Flue gas is generated as a byproduct of the combustion process and may be treated prior to being released into the atmosphere. For example, flue gas may be treated with amine solvents in an absorber for the removal of $CO_2$ to generate a treated flue gas. The absorber may include packings to facilitate contact between the flue gas and the amine solvent, thereby absorbing the $CO_2$ into the solvent in an exothermic reaction. The treated flue gas may include residual amounts of the amine solvent and degraded amines, and as such, it is treated further with a water wash system to scrub the amines (e.g., amine solvent and degraded amines) in the treated flue gas to generate a wash stream. Although the wash stream is directed to the $CO_2$ capture plant for reuse and regeneration, the presence of the degraded amines is problematic for the $CO_2$ capture plant. Accordingly, a need exists for removing degraded amines from the amine solvent.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

In certain embodiments, the present disclosure relates to a system including a solvent-based carbon capture system, wherein the solvent-based carbon capture system includes an absorber configured to absorb carbon oxides ($CO_x$) from a gas flow into a solvent of a solvent flow to produce a treated gas flow. The system includes a regenerator configured to strip the carbon oxides from the solvent flow to produce a captured carbon oxides flow. The system further includes a wash system configured to wash the treated gas flow using water. The system also includes an appendix stripper system configured to separate an outflow stream into a reclaimed amine stream and a waste stream, wherein the outflow stream comprises the solvent and, and the waste stream has a greater concentration of the degraded components than in the reclaimed amine stream.

In certain embodiments, a method includes absorbing carbon dioxide from a gas flow into a solvent of a solvent flow in an absorber of a solvent-based carbon capture system to produce a treated gas flow. The method includes stripping the carbon dioxide from the solvent of the solvent flow in a regenerator of the solvent-based carbon capture system to produce a captured carbon dioxide flow. The method also includes washing the treated gas flow using water in a wash system. The method further includes separating a outflow stream into a purified amine stream and a waste gas stream via an appendix stripper system, wherein the outflow stream comprises the solvent having one or more components at least partially caused by degradation of the solvent, and the waste gas stream has the one or more contaminants components in a higher concentration than in the purified amine stream.

In certain embodiments, a system includes a controller having a processor, a memory, and instructions stored on the memory and executable by the processor to control a solvent-based carbon capture system to control absorbing carbon dioxide from a gas flow into a solvent of a solvent flow in an absorber of a solvent-based carbon capture system to produce a treated gas flow. The instructions include stripping the carbon dioxide from the solvent of the solvent flow in a regenerator of the solvent-based carbon capture system to produce a captured carbon dioxide flow. The instructions also include washing the treated gas flow using water in a wash system. The instructions further include separating a recovered process amine stream into a purified amine stream and a waste gas stream via an appendix stripper system, wherein the recovered or purified amine stream comprises the solvent having one or more components at least partially caused by degradation of the solvent, and the waste gas stream has the one or more components in a higher concentration than in the purified amine stream.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
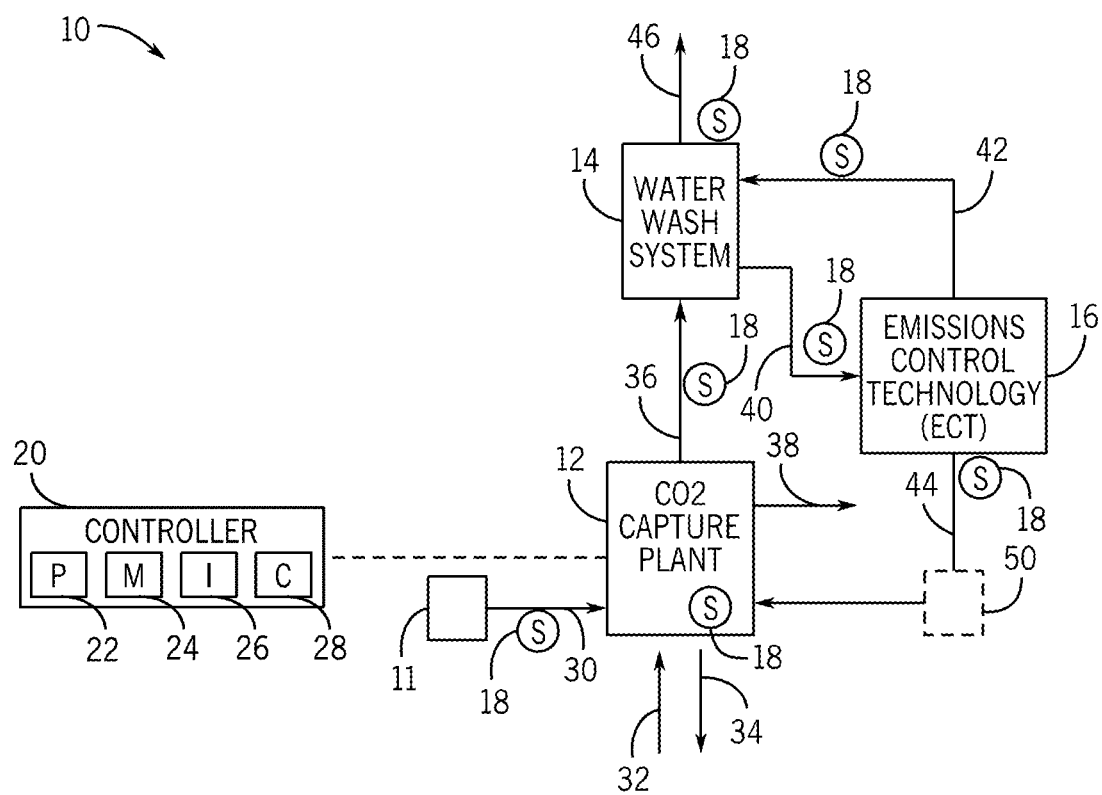
FIG. 1 is a block diagram of an embodiment of a wash system coupled to a carbon capture system, in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B. All numerical values within the detailed description herein are modified by "about" the indicated value, and take into account experimental error and variations that would be expected by a person having ordinary skill in the art. For example, "about" or "approximately" may refer to ±0.5%, ±1%, ±2, ±5%, ±10%, or ±15%.

The term "absorbent" refers to a solvent (e.g., amine solvent) that may be used to treat an untreated flue gas to remove undesirable gases. The term "NAS" or non-aqueous solvent refers to an organic solvent system that includes less than 0-20% water. Accordingly, it should be noted that absorbent, amine solvent, and NAS may be used interchangeably.

The terms "degraded amines", or "degraded components" refers to low boiling amines that are generated by a reaction between a flue gas and absorbent (e.g., amine solvent) in an absorber. For example, the degraded amines may exhibit standard atmosphere boiling points from about equal to or less than 60° C. and molecular weight less than or equal to 80 grams/mole (g/mol). Furthermore, it should be noted that the degraded amines may include additional components that are not amines (e.g., acetone, acetaldehyde, ethers) but are volatile and may be removed with the degraded amines. Accordingly, it should be noted that "degraded amines", "low boiling components", or "degraded components" may be used interchangeably.

In certain embodiments, a carbon capture system may be a solvent-based carbon capture system having an absorber, a stripper or regenerator, a solvent flow path through the absorber and the regenerator, one or more intercoolers coupled to the absorber, a wash system (e.g., wash columns) coupled to the absorber, and a reboiler coupled to the regenerator. As discussed in detail below, the disclosed embodiments reclaim the amine solvent by separating the amine solvent from an outflow stream using an appendix stripper. In operation, hot untreated flue gas may include components such as carbon oxides ($CO_x$) (e.g., carbon dioxide ($CO_2$) and carbon monoxide (CO)), sulfur oxides ($SO_x$), nitrogen oxides ($NO_x$), and oxygen ($O_2$) and particulates. A flue gas inlet filter may remove particulates. A gas blower may be coupled to the carbon capture system to increase the pressure of the filtered hot untreated flue gas to compensate for a decrease in pressure as the hot untreated flue gas comes into contact with a scrubber. The scrubber may remove (e.g., scrub) SOx in the flue gas. In some embodiments, the scrubber may use aqueous sodium hydroxide (NaOH) solution. After scrubbing, the untreated flue gas is cooled and water is condensed out.

The untreated flue gas is then routed from the scrubber to an absorber (e.g., absorber column). The absorber contains sections with packing materials (e.g., beads) to increase contact and residence time between the untreated flue gas and an absorbent (e.g., an amine solvent or other absorbent fluid), thereby facilitating absorption of undesirable gases (e.g., $CO_2$) from the untreated flue gas into the amine solvent (e.g., NAS). The absorption process is an exothermic process, and thus heat is added to the amine solvent in the absorber. Accordingly, intercoolers are employed to reduce the solvent temperature in the absorber, thereby helping to improve the efficiency of the absorption process. Subsequently, as the absorption process absorbs the undesirable gases from the untreated flue gas, the absorber may generate a treated flue gas that may include reduced emissions of the undesirable gases (e.g., $CO_2$). The solvent emissions of the treated flue gas may be less than about 400 parts per million (ppm), such as between about 200-400 ppm.

As such, the treated flue gas may be directed to the wash system, including one or more water wash columns (e.g., first water wash column, second water wash column) and/or an acid wash column. In the one or more water wash columns, cooling water (e.g., cold water) is used to cool the treated flue gas to remove residual amine solvent. The residual amine solvent may be an entrained liquid, gas, or any combination thereof. In general, the residual amine solvent may include a mixture of degraded amines (e.g., light amine components) and the amine solvent. Accordingly, the first water wash column may scrub the residual amine solvent from the treated flue gas and generate a wash stream, wherein the wash stream may include a mixture of water, the degraded amines, and the amine solvent. The wash stream may be directed to an emissions control technology (ECT) (e.g., filter beds, flow control systems, buffer tanks) to separate amines (e.g., degraded amines and amine solvent) from the water to generate an outflow stream. In this way, the outflow stream (e.g., a mixture of the amine solvent and the degraded amines) may be recycled back to the carbon capture system for reuse. Unfortunately, thousands of kilograms of the light amine components may be recycled as part of the outflow stream per year, which is problematic as the light amine components are volatile and can dilute $CO_2$ product streams and affect the regenerator. Furthermore, the presence of the light amine components can alter the phase behavior (e.g., solubility and vapor-liquid equilibrium) and physical properties (e.g., density, viscosity, etc.) of the amine solvent (e.g., NAS). Accordingly, it may be desirable to separate the light amine components from the outflow stream before recycling back to the carbon capture system as a reclaimed amine stream. However, efficient systems to separate the light amine components from the outflow stream have yet to be identified without the presently disclosed embodiments.

This disclosure relates to systems and methods for an appendix stripper to separate the degraded amines (e.g., light amine components) from the outflow stream to reclaim the amine solvent (e.g., NAS), thereby generating a reclaimed amine stream. In general, the outflow stream may include a mixture of light amine components and the amine solvent. As such, separation of the outflow stream may include the appendix stripper receiving the contaminated stream to generate a stream primarily consisting of the amine solvent that can be recycled back to the $CO_2$ capture plant and subsequently reused as the absorbent. In this way, the techniques described herein increase the purity of the amine solvent from the outflow stream by removing the degraded amines.

In one embodiment, the NAS may include one or more primary solvent components (e.g., cyclic amines, aromatic amines). The appendix stripper may receive the outflow stream, which may include a mixture of water, NAS, and degraded amines. For example, NAS may be separated from the degraded amines in the outflow stream based on differences in physical properties (e.g., molecular weight, boiling point, solubility, or a combination thereof) of the amines to generate a reclaimed amine stream enriched in NAS, which can be recycled back to the $CO_2$ capture plant accordingly. Accordingly, the appendix stripper may generate a reclaimed amine stream that exhibits high cyclic amine purity based on the outflow stream.

In general, non-aqueous solvent (NAS) may include an organic solvent system that may be partially miscible with water or immiscible with water. For example, the NAS system may utilize a solvent having 0-20 wt % water, 0-15 wt % water, 2.5-12.5 wt % water, or 2.5-10 wt % water. The NAS may include polar aprotic solvent systems, protic solvent systems, and mixtures thereof. In some embodiments, the NAS includes a nitrogenous base (e.g., an amine, such as an organic amine) and an organic diluent. In some embodiments, the NAS further includes water.

The nitrogenous base of the NAS may include an amine (e.g., a primary amine, a secondary amine), an amidine, a guanidine (e.g., 1,1,3,3-tetramethylguanidine ("TMG")), a triazole (e.g., 1,2,3-triazole, 1,2,4-triazole), or combinations thereof. In some embodiments, the nitrogenous base includes a hydrophobic amine. The amine may include one or more of N-methylbenzylamine (NMBA), 2-fluoro-N-methylbenzylamine, 3-fluoro-N-methylbenzylamine, 4-fluoro-N-methylbenzylamine, 3,5-difluorobenzylamine, 1,4-diazabicyclo-undec-7-ene, 1,4-diazabicyclo-2,2,2-octane, piperazine ("PZ"), triethylamine ("TEA"), 1,8-diazabicycloundec-7-ene ("DBU"), monoethanolamine ("MEA"), diethyl amine ("DEA"), ethylenediamine ("EDA"), methyldiethanolamine (MDEA), 2-amino 1-propanol (AMP), 1,3-diamino propane, 1,4-diaminobutane, hexamethylenediamine, 1,7-diaminoheptane, diethanolamine, diisopropylamine ("DIPA"), 4-aminopyridine, pentylamine, hexylamine, heptylamine, octylamine, nonyl amine, decylamine, tert-octylamine, dioctylamine, dihexylamine, 2-ethyl-1-hexylamine, 2-fluorophenethylamine, 3-fluorophenethylamine, 4-fluorophenethylamine, D-4-fluoro-alpha-methylbenzylamine, L-4-fluoro-alpha-methylbenzylamine, imidazole, benzimidazole, N-methyl imidazole, 1-trifluoroacetylimidazole, or combinations thereof.

The organic diluent may include a polyether diluent and may be selected from the group consisting of alcohols, ketones, aliphatic hydrocarbons, aromatic hydrocarbons, nitrogen heterocycles, oxygen heterocycles, aliphatic ethers, cyclic ethers, esters, and amides and mixtures thereof. The organic diluent may be formulated and configured to remove at least some of the acid gases (e.g., $CO_2$) in the $CO_2$-containing gas by directly contacting the $CO_2$-containing gas.

The NAS may include a mixture of the nitrogenous base, the organic diluent, and water. The NAS may include substantially equal proportions by molarity of the nitrogenous base and the organic diluent. In some such embodiments, the nitrogenous base and the organic diluent are present in the NAS in equimolar amounts.

In some embodiments, the NAS includes a greater weight percent of the nitrogenous base than of the organic diluent. The nitrogenous base may constitute from about 40.0 weight percent to about 70 weight percent of the NAS, such as from about 40.0 weight percent to about 50.0 weight percent, from about 50.0 weight percent to about 60.0 weight percent, or from about 60.0 weight percent to about 70.0 weight percent of the NAS.

The organic diluent may constitute from about 30.0 weight percent to about 50.0 weight percent of the NAS, such as from about 30.0 weight percent to about 35.0 weight percent, from about 35.0 weight percent to about 40.0 weight percent, from about 40.0 weight percent to about 45.0 weight percent, or from about 45.0 weight percent to about 50.0 weight percent of the NAS.

Water may constitute from about 2.5 weight percent to about 12.5 weight percent of the NAS, such as from about 2.5 weight percent to about 3.0 weight percent, from about 3.0 weight percent to about 4.0 weight percent, from about 4.0 weight percent to about 5.0 weight percent, from about 5.0 weight percent to about 6.0 weight percent, from about 6.0 weight percent to about 7.0 weight percent, from about 7.0 weight percent to about 8.0 weight percent, from about 8.0 weight percent to about 9.0 weight percent, from about 9.0 weight percent to about 10.0 weight percent, from about 10.0 weight percent to about 11.0 weight percent, or from about 11.0 weight percent to about 12.5 weight percent of the NAS. However, the disclosure is not so limited, and the weight percent of the water in the NAS may be different than that described.

The NAS may have a density within a range of from about 0.85 $g/cm^3$ to about 1.05 $g/cm^3$, such as from about 0.90 $g/cm^3$ to about 0.98 $g/cm^3$, such as from about 0.90 $g/cm^3$ to about 0.92 $g/cm^3$, from about 0.92 $g/cm^3$ to about 0.94 $g/cm^3$, from about 0.94 $g/cm^3$ to about 0.96 $g/cm^3$, or from about 0.96 $g/cm^3$ to about 0.98 $g/cm^3$. In some embodiments, the density of the NAS is about 0.94 $g/cm^3$.

In some embodiments, the carbon capture system may be controlled by a controller (e.g., processor-based controller having a processor, memory, and instructions or control logic stored on the memory and executable by the processor). Accordingly, the appendix stripper may be communicatively coupled to the controller or integrated into the controller to adjust operational parameters of the carbon capture system. For example, the controller may facilitate in automatically adjusting the parameters of the appendix stripper based on a comparison of sensor feedback from various sensors and threshold data associated with the wash system (e.g., first water wash, second water wash, acid wash), ECT, appendix stripper, regenerator, and absorber. The various sensors may provide feedback associated with the temperature, pressure, flow rate, composition, density, flow, pH, molarity, or any combination thereof, of the flue gas, the amine solvent, the diluted amine stream generated by the water wash, the outflow stream, or reclaimed amine stream generated by the appendix stripper, or any combination thereof. For example, the sensors may monitor compositions, temperature, density, flow, pH, and molarity of one or more streams generated by the wash system, ECT, appendix stripper, regenerator, and absorber. The sensors may also monitor the compositions of the flue gas and/or $CO_2$ product streams. In response to sensor feedback, the controller may modify one or more operational parameters of the appendix stripper (e.g., increase or decrease thermal energy) to optimize removal of degraded amines and/or increase purity of the NAS. In certain embodiments, the controller may receive inputs from the user, thereby allowing the controller to adjust the operation and adjust cycle times/processes based on the selection provided by the user. As such, inefficient processes of the carbon capture system may be optimized to improve energetics of the carbon capture system.

As part of the control based on sensor feedback, the controller may compare the sensor feedback to threshold values, such as upper and lower thresholds, associated with the purity of the reclaimed amine stream and cyclic amine recovery generated by the appendix stripper (e.g., conversion, selectivity, yield). For example, the controller may compare the sensor feedback of the composition of the reclaimed amine stream with respect to a threshold composition value associated with the outflow stream. Based on the comparison, if the amount of cyclic amine in the reclaimed amine stream is less than the threshold value, the controller may provide additional energy (e.g., thermal energy) to the appendix stripper to increase the separation of cyclic amine from the outflow stream. As such, sensor feedback enables maximization and optimization of amine recovery and removal of degraded amines, thereby ensuring that the reclaimed amine stream includes high purity cyclic amine which can be recycled to the $CO_2$ capture plant. In certain embodiments, the controller may receive inputs from the user, such as batch logged-in data or in-situ data, thereby allowing the controller to adjust the appendix stripper parameters based on the selection provided by the user. In this way, reclamation of the amine solvent is maximized. Various aspects of the appendix stripper to separate the degraded amines (e.g., light amine components) from the outflow stream to reclaim the amine solvent (e.g., NAS) are described in detail below with reference to the drawings.

With the foregoing in mind, FIG. 1 is a block diagram of an embodiment of a wash system 10 coupled to a carbon capture system, such as a $CO_2$ capture plant 12, and a purification system 50. In general, FIG. 1 demonstrates an example of the wash system 10. The wash system 10 may include a water wash system 14 (e.g., first water wash, second water wash, and/or acid wash), the emissions control technology (ECT) 16, sensors 18, and a controller 20. It should be noted that certain components have been omitted for simplicity. Furthermore, it should be noted that the water wash system 14 may include a plurality of components (e.g., a plurality of water washes and/or an acid wash) in various stages.

An untreated flue gas 30 (e.g., $CO_2$ rich gas stream) may be provided to the $CO_2$ capture plant 12 from an industrial plant 11. For example, exhaust gas from the combustion of hydrocarbon materials may be received by the $CO_2$ capture plant 12 as the untreated flue gas 30. The untreated flue gas 30 may include a variety of undesirable gases, such as ($CO_x$) (e.g., ($CO_2$) and (CO), sulfur oxides ($SO_x$), ($NO_x$), and ($O_2$), and particulates, which may be at least partially removed by the $CO_2$ capture plant 12 to generate a partially treated flue gas 36 and $CO_2$ product stream 38. In some embodiments, the untreated flue gas 30 may be treated prior to entering an absorber to scrub $SO_x$. For example, in the absorber of the $CO_2$ capture plant 12, the untreated flue gas 30 may be treated with an absorbent (e.g., amine solvent (e.g., NAS)) to remove the undesirable gases (e.g., $CO_2$), thereby generating the partially treated flue gas 36 and a $CO_2$-rich amine solvent. For example, the NAS may chemically absorb $CO_2$ from the untreated flue gas 30. As such, the partially treated flue gas 36 may include $CO_2$ amounts substantially less than the untreated flue gas 30. The partially treated flue gas 36 may also include water, $NO_x$, and $O_2$. In the stripper or regenerator of the $CO_2$ capture plant 12, a heat source (e.g., steam 32) is used to strip the $CO_2$ from the $CO_2$-rich amine solvent, thereby outputting the $CO_2$ product stream 38 and regenerating the amine solvent as a $CO_2$-lean (or substantially $CO_2$-free) amine solvent for reuse in the absorber. Thus, the steam 32 may be provided to the $CO_2$ capture plant 12 to support operations of the $CO_2$ capture plant 12 (e.g., steam for regenerator). after which condensate 34 may be generated as a byproduct of the operations by the $CO_2$ capture plant 12.

Due to the treatment with the absorbent, the partially treated flue gas 36 may include residual amine amounts. For example, the partially treated flue gas 36 may include entrained molecules, such as a mixture of the amine solvent (e.g., NAS), degraded amines (e.g., low molecular weight amines), aldehydes (e.g., formaldehyde, acetaldehyde), acetone, and ethers. In another example, the NAS may include cyclic amines. In general, the degraded amines are generated during the exothermic reaction between the absorbent and the untreated flue gas 30 in the absorber. Accordingly, the partially treated flue gas 36 may be directed to the water wash system 14 via one or more conduits to scrub the residual amine amounts from the partially treated flue gas 36.

In general, the water wash system 14 treats flue gas to remove components in order to meet regulatory thresholds associated with gas emissions into the atmosphere. The water wash system 14 may include a first water wash (e.g., water wash system or stage). It should be noted that while not illustrated, the wash system may include a second water wash (e.g., water wash system or stage) and/or an acid wash (e.g., acid wash system or stage). For example, the water wash system 14 may employ a plurality of wash nozzles, a plurality of perforated tubes, a grid of wash jets, or a combination thereof, for each wash section or stage.

The water wash system 14 may receive the partially treated flue gas 36 from the absorber overhead containing components (e.g., NAS contaminated with degraded amines, formaldehyde, acetaldehyde, acetone, and ethers). It should be noted that the components may include amounts in parts per millions (ppm). The partially treated flue gas 36 may also include NOx, $H_2O$ vapor, $O_2$, and small quantities $CO_2$. One or more columns of the water wash system 14 may provide cold water to the partially treated flue gas 36 to remove (i.e., wash) the residual amine amounts and generate a wash stream 40 and treated flue gas 46. For example, cold water may be introduced at the top of the first water wash column counter currently to scrub the amines in the partially treated flue gas 36 flue gas. In general, the treated flue gas 46 may include amine amounts substantially less than the partially treated flue gas 36. In some embodiments, the treated flue gas 46 may be subsequently provided to additional water washes (e.g., second water wash) and/or acid wash systems prior to being released into the atmosphere. Concomitantly, the wash stream 40 may be directed to the ECT 16 for further processing.

The wash stream 40 may include a mixture of cyclic amine and degraded amines (e.g., methyl amine, dimethylamine, ethyl amine, diethyl amine), and water. The ECT 16 may be positioned downstream from the water wash system 14, such that it may receive the wash stream 40. The ECT 16 may control inputs to the water wash system 14 to modify emission amounts in the treated flue gas 46. For example, the ECT 16 may control and/or affect emissions in flue gas based on comparing sensor inputs of one or more streams (e.g., partially treated flue gas 36, wash stream 40, water stream 42, and treated flue gas 46) to threshold values associated with each of the one or more streams. In one example, if emissions in the treated flue gas 46 are too high, the ECT 16 may modify any of the one or streams by (a) increasing flow rate of water stream 42; (b) altering temperature of water stream 42; (c) adjusting level of amines in wash stream 40; and/or (d) controlling the purification system 50 (e.g., appendix stripper system 100 of FIGS. 2-4) or makeup of water in loop. Increasing the flow rate of the water stream 42 and/or increasing the purity of water in the water stream 42 may increase the amines washed from the treated flue gas 46. Decreasing the temperature of the water stream 42 may enhance the solubility of amines in the water, thereby increasing the amines washed from the treated flue gas 46. The wash stream 40 may be partially or completely bypassed around filters of the ECT 16 based on monitoring the level of amines in the wash stream 40. For example, routing at least a portion of the wash stream 40 through filters of the ECT 16 may increase the solubility of amines in the water stream 42. In this way, the ECT 16 may separate the amines (e.g., cyclic amine and degraded amines) from the wash stream 40.

In some embodiments, the ECT 16 may include filter beds that filter the amines from the water, thereby generating a water stream 42 that can be recycled back to the water wash system 14 and subsequently used to scrub amines from the partially treated flue gas 36. As such, the water stream 42 primarily consists of high purity water relative to the wash stream 40. Concurrently, the ECT 16 may generate a outflow stream 44 based off the wash stream 40. In general, the outflow stream 44 may include amounts the degraded amines and the cyclic amine in greater amounts relative to the water stream 42 (or wash stream 40). The outflow stream 44 may be redirected back to the $CO_2$ capture plant such that it may be regenerated and reused by the $CO_2$ capture plant accordingly. In some embodiments, the outflow stream 44 may be directed to the purification system 50, which is positioned downstream from the ECT 16, for purification (i.e., separation of degraded amines from cyclic amine).

In the illustrated embodiment, the controller 20 may be configured to control all aspects of the wash system 10 and/or carbon capture system (e.g., $CO_2$ capture plant). The controller 20 includes one or more processors 22 (i.e., distributed control system (DCS) and programmable logic controller (PLC), memory controller unit (MCU) 24, instructions (i.e., control logic, programming codes, and execute commands stored on the memory 24 and executable by the processor 22, and communication circuitry 28 configured to communicate with sensors 18 and various equipment of the wash system 10. For example, the controller 20 is configured to receive sensor feedback from sensors 18 coupled to the $CO_2$ capture plant 12, water wash system 14, ECT 16, one or more streams generated by the wash system 10, and/or additional components of the wash system 10 and control the same equipment based on the sensor feedback, operating modes, user input, computer models, or any combination thereof. The wash system 10 described herein may also include various sensors 18 positioned along solvent flow paths, gas flow path, and coolant flow paths. For example, the sensors 18 may include temperature sensors, pressure sensors, flow rate sensors, gas composition sensors (e.g., to determine amine amounts (e.g., degraded amines, cyclic amine) concentration in gas phase), liquid composition sensors (e.g., to determine amine (e.g., degraded amines, cyclic amine) concentration in liquid phase), or any combination thereof. The sensors 18 can be a combination of one or more of the following: elements, transmitters, control blocks, time rate, quantity ratio, and mathematical functions. Accordingly, the controller 20 is configured to control operation of the wash system 10 such by controlling modes of operation based on sensor feedback.

Figure 2:
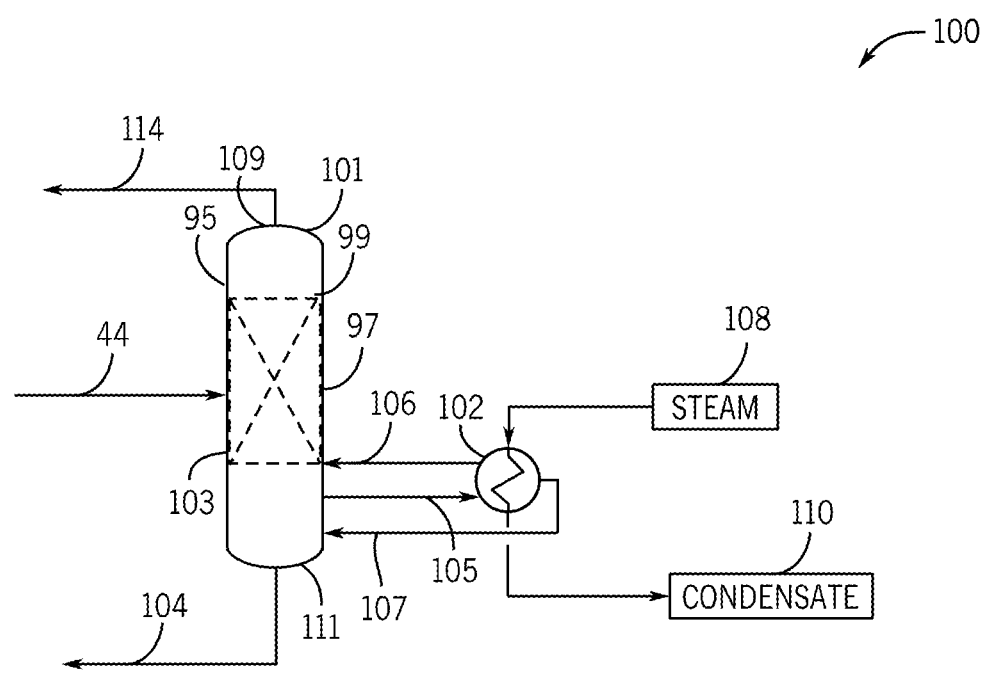
FIG. 2 is a schematic view of an appendix stripper system, in accordance with the present disclosure.

With the preceding in mind, FIG. 2 is a schematic view of an appendix stripper system 100. In general, the appendix stripper system 100 is an example of the purification system 50 of FIG. 1 and may include an appendix stripper 101 coupled to a reboiler 102 (e.g., a low pressure steam kettle reboiler, a heat exchanger) to facilitate separation of components within a stream (e.g., outflow stream 44). The appendix stripper 101 may include a hollow vessel or enclosure 95 (e.g., an annular vessel) supporting one or more packings or trays 97 within an interior chamber 99. Accordingly, FIG. 2 demonstrates that the appendix stripper 101 may be positioned to receive the outflow stream 44 and generate a reclaimed amine stream 104 (e.g., cyclic amine,) by leveraging differences in boiling points of the components within the outflow stream 44.

In general, the appendix stripper 101 is a short column (e.g., about 3 to about 4 theoretical stages) that may operate at approximately 2 barg and may include sections with packings or trays 97 (e.g., beads held between upper and lower screens) to facilitate separation of streams (e.g., outflow stream 44). It should be noted that the packings or trays 97 may be random or structured. Accordingly, the appendix stripper 101 may receive the outflow stream 44 via an inlet port 103. Concomitantly, the reboiler 102 receives a solvent stream 105 from the appendix stripper 101, transfers heat from a steam 108 to the solvent stream 105 to reheat or boil the solvent stream, returns one or more vapor streams 106 (e.g., vaporized solvent streams) back to the appendix stripper 101, and outputs a condensate 110. In particular, as the steam 108 transfers heat to the solvent stream 105, the solvent stream 105 is vaporized to generate the one or more vapor streams 106 while the steam 108 is cooled and condensed to generate the condensate 110. Thus, the reboiler 102 operates as an indirect heat exchanger, such as a fin and tube heat exchanger. In some embodiments, the reboiler 102 may be configured for direct exchange between the steam 108 and the solvent stream 105 and/or a portion of the steam 108 may be supplied directly into the appendix stripper 101 as illustrated by steam stream 107. In general, the outflow stream 44 is received by the appendix stripper 101, wherein the outflow stream 44 may flow downwards through the appendix stripper 101, which is countercurrent with respect to the vapor stream 106 generated by the reboiler 102 and/or the steam stream 107. Accordingly, the one or more vapor streams 106 and/or steam streams 107 heat the outflow stream 44, thereby causing volatilization of the degraded amines in the outflow stream 44.

In particular, the degraded amines may exhibit low molecular boiling points ranging from about −40° C. to about 60° C., molecular weight about less than or equal to 80 g/mol, and may be soluble in water, which can be seen below in Table 1. It should be noted that while the absorber, regenerator, and stripper may operate at different pressures, the boiling points of the degraded amines provided herein are standard atmospheric boiling points (e.g., 1 atm ~1 bar). Heat provided by the reboiler 102 may facilitate volatilization of the degraded amines, such that the volatilized degraded amines may exit from the top of the appendix stripper 101 via an outlet port 109, thereby generating waste stream 114. Concomitantly, the NAS may include amines that exhibit a high boiling point and may be insoluble in water (e.g., cyclic amine). As such, amines that exhibit boiling points greater than 60° C. and are insoluble may remain in the appendix stripper 101 and exit from the bottom via an outlet port 111 to generate the reclaimed amine stream 104. The reclaimed amine stream 104 may include cyclic amine with minimal amounts of water relative to the outflow stream 44. It should be noted that the type of components and/or amounts of components within the reclaimed amine stream 104 may vary depending on the location of the appendix stripper system 100. For example, a reclaimed amine stream 104 generated in the system of FIG. 2 may not include diluent, while a reclaimed amine stream 104 generated in the systems of FIG. 4 may include diluent. For example, the appendix stripper 101 may generate the reclaimed amine stream 104, which may include cyclic amine and water with a high recovery rate at about greater than 99 weight (wt.) % and dry purity at about greater than 99 weight (wt.) %. In contrast, the waste stream 114 may include greater amounts of water vapor and degraded amines relative to the reclaimed amine stream 104. The waste stream 114 may exit the stack as treated flue gas 46. It should be noted that the reboiler 102 may utilize 200-400 kilowatts (kW) of energy, which is a small amount of energy relative to the specific reboiler duty (SRD) of large $CO_2$ capture plants. For example, the reboiler 102 described herein may utilize less than 0.5%, less than 1%, or less than 2% of the energy input of the regenerator 206 of a $CO_2$ capture plant capable of removing greater than 100 metric tons of $CO_2$ per year. The reclaimed amine stream 104 is returned to the $CO_2$ capture plant 12 to be reused and regenerated. Furthermore, the appendix stripper system 100 is a small, skidded module that may operate continuously or in a batch mode and can be employed for full (e.g., substantially all) or partial (e.g., a portion of) removal of degraded amines from the recycled amine stream 104. For example, if an amount of degraded amines in a stream (e.g., outflow stream 44, reclaimed amine stream 104) is greater than a threshold value (e.g., greater than 20 wt. %, greater than 15 wt. %, greater than 10 wt. %, greater than 9 wt. %, greater than 8 wt. %, greater than 7 wt. %, greater than 6 wt. %, greater than 5 wt. %, greater than 4 wt. %, greater than 3 wt. %, greater than 2 wt. %, greater than 1 wt. %), the appendix stripper system 100 may be configured to operate via batch mode. The appendix stripper system 100 may operate until the amount of degraded amines in the stream (e.g., outflow stream 44, reclaimed amine stream 104) is less than a threshold value (e.g., less than 1 wt. %, less than 0.75 wt. %, less than 0.5 wt. %). In this way, the appendix stripper system 100 facilitates a reduction in energy costs, as the appendix stripper system 100 may be utilized as-needed depending on the composition of the stream.

With the foregoing in mind, Table 2 demonstrates a cyclic amine reclamation process using the appendix stripper system 100. In one example, the appendix stripper system 100 may recover greater than or equal to about 99 weight % (wt. %) of cyclic amine (e.g., reclaimed amine stream 104) from the process amine stream 44, such as about 99.1 wt. %, 99.2 wt. %, 99.3 wt. %, 99.4 wt. %, 99.5%, 99.6 wt. %, 99.7 wt. %, 99.8 wt. %, 99.9 wt. %, or about 100 wt. %. In another example, the cyclic amine purity in the bottom stream (e.g., reclaimed amine stream 104) on a dry basis in wt. % may be greater than or equal to about 98 wt. %, such as about 98.0 wt. %, 98.1 wt. %, 98.2 wt. %, 98.3 wt. %, 98.4 wt. %, 98.5%, 98.6 wt. %, 98.7 wt. %, 98.8 wt. %, 98.9 wt. %, 99 wt. % 99.1 wt. %, 99.2 wt. %, 99.3 wt. %, 99.4 wt. %, 99.5%, 99.6 wt. %, 99.7 wt. %, 99.8 wt. %, 99.9 wt. %, or about 100 wt. %. Accordingly, the systems and methods described herein advantageously increase purity of the NAS by removing degraded amines and other components.

Figure 3:
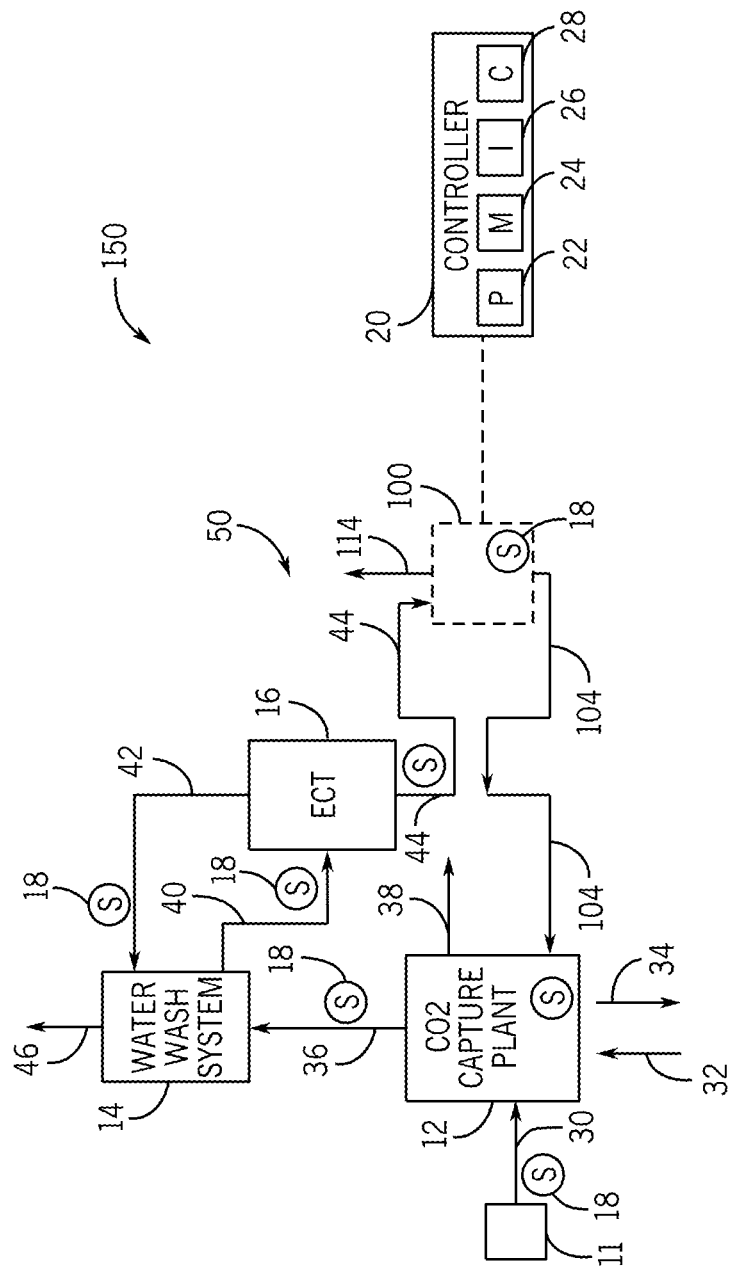
FIG. 3 is a block diagram of an embodiment of the appendix stripper system coupled to the wash system of FIG. 1, in accordance with the present disclosure.

By way of example, FIG. 3 is a block diagram of an embodiment of the appendix stripper system 100 (e.g., purification system of FIG. 1) coupled to the wash system 10 of FIG. 1. In general, the example system 150 may include the appendix stripper system 100 of FIG. 2, which may be positioned downstream from the ECT 16 such that it is configured to receive the outflow stream 44. The appendix stripper system 100 will separate the degraded amines from the cyclic amine to generate the waste stream 114 and reclaimed amine stream 104. For example, the appendix stripper 101 may operate at low pressure and low temperatures (e.g., about 2 barg to about 4 barg at about 5° C. to about 30° C.) and generate the reclaimed amine stream 104 with a composition including mostly water (e.g., water wt. %>cyclic amine wt. %>degraded components). The reclaimed amine stream 104 may be routed back to the $CO_2$ capture plant 12 for regeneration.

In the illustrated embodiment, the controller 20 may be configured to control all aspects of the wash system 10, appendix stripper system 100, and/or carbon capture system (e.g., $CO_2$ capture plant 12). For example, the controller 20 is configured to receive sensor feedback from sensors 18 coupled to the $CO_2$ capture plant 12, water wash system 14, ECT 16, appendix stripper system 100, one or more streams generated by the wash system 10, one or more streams generated by the carbon capture system, one or more streams generated by the appendix stripper system 100, and/or additional components of the wash system 10 and control the same equipment based on the sensor feedback, operating modes, user input, computer models, or any combination thereof. It should be noted that the locations of the appendix stripper system 100 is meant to be exemplary and can be integrated at any location of the example system 150 as suitable for the example system 150.

The differences in the physical properties of the NAS components (e.g., cyclic amine) and degraded amines enables purification and recovery of the cyclic amine as part of the reclaimed amine stream 104. In contrast, conventional carbon capture solvents contain components that exhibit similar physical properties, and thus, cannot be separated efficiently. Accordingly, present embodiments leverage differences in boiling points to facilitate separation between degraded amines and cyclic amines to obtain the reclaimed stream 104. The presence of the appendix stripper system 100, which utilizes low energy, provides a significant advancement in the capture and removal of degraded amines from cyclic amine.

TABLE 1

Properties of components of the outflow stream 44.

| Example Recovered Amine Stream Component | Molecular Weight (g/mol) | Boiling Point (° C.) |
|---|---|---|
| Dimethyl ether | 46.1 | −24 |
| Formaldehyde | 30.0 | −19 |
| Methylamine | 31.1 | −6 |
| Dimethylamine | 45.1 | 7 |
| Ethylamine | 45.1 | 17 |
| Acetaldehyde | 44.1 | 20 |

TABLE 1-continued

Properties of components of the outflow stream 44.

| Example Recovered Amine Stream Component | Molecular Weight (g/mol) | Boiling Point (° C.) |
|---|---|---|
| Acetone | 58.1 | 56 |
| Diethylamine | 73.1 | 56 |
| Piperazine | 86.3 | 146 |
| N-methylcyclohexylamine | 113.2 | 148 |
| 2-(trifluoromethyl) phenylamine | 161 | 152 |
| 1-methylcycloheptylamine | 127.2 | 176 |
| Benzylamine | 107.1 | 184 |
| N-methylbenzylamine | 121.2 | 184-189 |
| Diethylene glycol dibutyl ether | 218.3 | 256 |
| Triethylene glycol dibutyl ether | 206.3 | 278 |
| Toluenediamine | 122.1 | 284 |
| 1-napthylamine | 143.2 | 294 |
| Diphenylamine | 169.2 | 302 |
| Tetraethylene glycol dibutyl ether | 222.3 | 366 |
| 4,4-oxybis(1,2-benzenediamine) | 230.2 | 509 |
| Cyclotetramethylenetetranitramine | 296 | 527 |

With the foregoing in mind, Table 1 is an example of some of components and properties thereof that may be in the outflow stream 44 that can be separated via the appendix stripper system 100 of FIGS. 2 and 3. For example, the outflow stream 44 may include a mixture of the degraded amines and components associated with the NAS that exhibit differences in their physical properties (e.g., structure, molecular weight, solubility in water, boiling point). In the foregoing example, the degraded amines generally exhibit low molecular weights, high solubility in water, low boiling points, and high volatility. For example, the boiling points of the degraded amines may range between about −40° C. to about 60° C. with a molecular weight less than or equal to 80 g/mol and readily volatilize in the appendix stripper 101. For example, the degraded amines may include primary amines (e.g., methyl amine, ethyl amine), secondary amines (e.g., dimethylamine, diethylamine), or a combination thereof. The outflow stream 44 may also include other components that are volatile (i.e., exhibit low boiling points and behave similarly to primary amines and/or secondary amines (e.g., methyl amine and ethyl amine)) in amounts that are in parts per million and may be removed as part of the waste stream 114. The other components may include aldehydes (e.g., formaldehyde, acetaldehyde), acetones, ethers (e.g., dimethyl ether), or a combination thereof. In contrast, the outflow stream 44 may also include NAS components that exhibit high boiling points (greater than about 60° C.) and as such, are recovered as part of the reclaimed amine stream 104. For example, the NAS components may include cyclic amines/aromatic amines that exhibits a high molecular weight, low solubility in water, high boiling point, and low volatility relative to the degraded amines. In some embodiments, the NAS components (or outflow stream 44) may also include additional ethers (e.g., diethylene glycol dibutyl ether, triethylene glycol dibutyl ether, tetraethylene glycol dibutyl ether) that act as stabilizing agents for the NAS solvent (e.g., NAS stabilizing agents), and as such, may be recovered as part of the reclaimed amine stream 104. It should be noted while the additional ethers exhibit boiling points greater than cyclic amine, they do not negatively impact the $CO_2$ capture process. As such, use of the appendix stripper system 100 enables separation of the outflow stream 44 by differences in boiling point, molecular weights, and solubility of the components.

Figure 4:
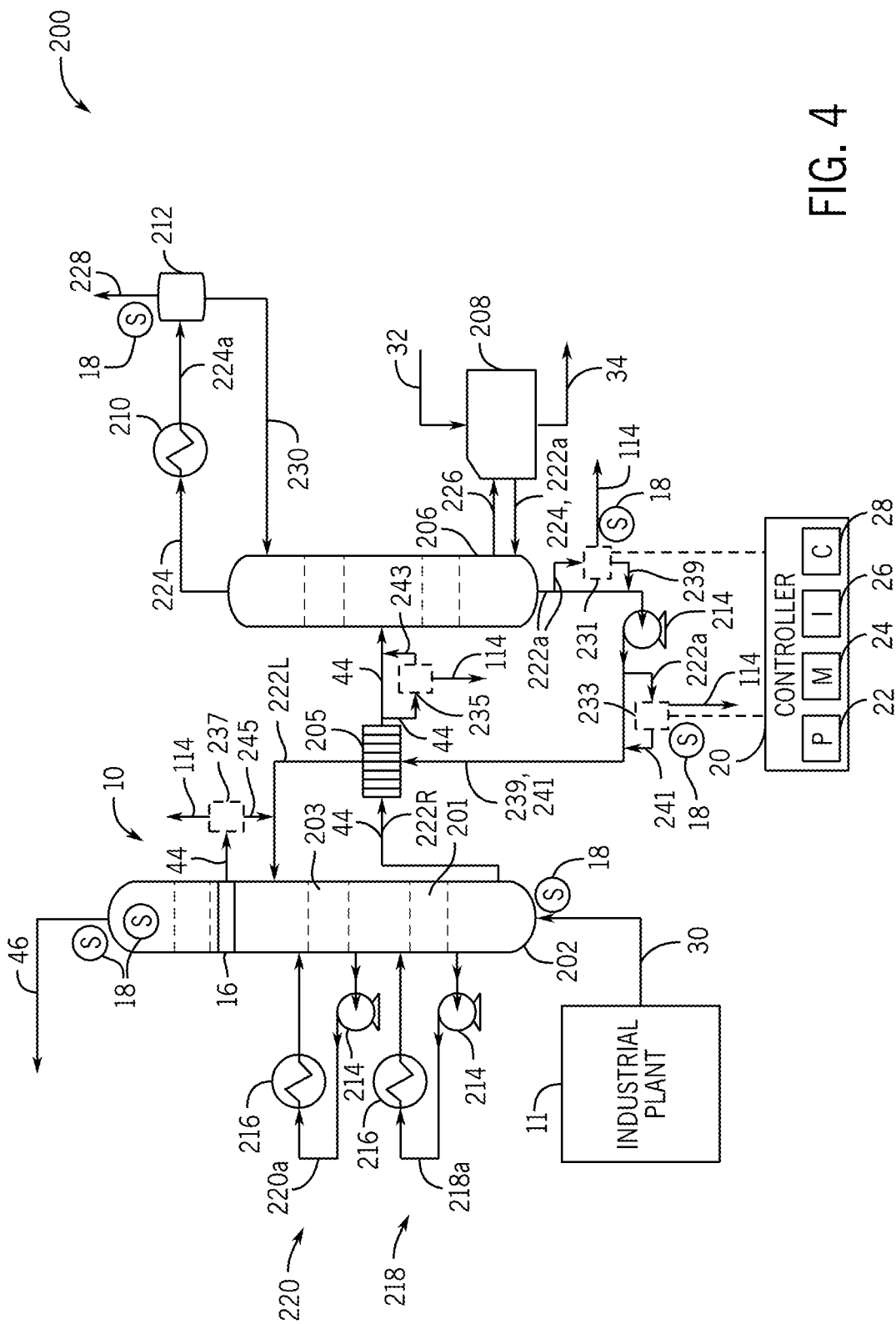
FIG. 4 is a schematic view of a carbon capture system with the wash system and appendix stripper system.

With the foregoing in mind, FIG. 4 is a schematic view of a carbon capture system 200 (e.g., $CO_2$ capture plant 12) with the wash system 10, example system 150, and appendix stripper system 100 of FIGS. 1-3. In general, the carbon capture system 200 includes the $CO_2$ capture plant 12, appendix stripper system 100, an absorber 202, the controller 20, a lean/rich absorbent heat exchanger (lean/rich HEX) 205, a stripper or regenerator 206, a reboiler 208, a reflux condenser 210, and a knock out drum (e.g., reflux drum) 212. The carbon capture system 200 may include pumps 214, sensors 18, and intercoolers 216 (e.g., heat exchangers) coupled to one or more components of the carbon capture system 200. For example, the absorber 202 may include an interstage cooler systems 218, 220 (e.g., intercoolers) and the wash system 10 (of FIGS. 1 and 3). As discussed in detail below, the appendix stripper system 100 is configured to separate components of the outflow stream 44 by differences in boiling point of the components.

An industrial plant 11 generates an untreated flue gas 30. For example, exhaust gas from the combustion of hydrocarbon materials may be discharged from the industrial plant 11 as the untreated flue gas 30 (e.g., $CO_2$ rich gas stream), which is in direct fluid communication with the absorber 202 via a conduit (e.g., pipe). The untreated flue gas 30 may include a variety of undesirable gases, such as carbon oxides ($CO_x$) (e.g., carbon dioxide ($CO_2$) and carbon monoxide (CO), sulfur oxides ($SO_x$), nitrogen oxides ($NO_x$), and oxygen ($O_2$), which may be at least partially removed by the absorber 202. For example, the absorber 202 may be configured to at least partially or substantially remove the carbon oxides, such as $CO_2$, from the untreated flue gas 30. In some embodiments, a direct contact cooler (DCC) may directly contact the untreated flue gas 30 with a cooling fluid (e.g., water) to lower the temperature of the untreated flue gas 30 prior to entering the absorber 202 and may remove some of the undesirable contents (e.g., $SO_x$) in the untreated flue gas 30. For example, the temperature of the untreated flue gas 30 may range from about 25° C. to 40° C.

The absorber 202 may be configured to receive the untreated flue gas 30 via an inlet port (e.g., as input). The untreated flue gas 30 may flow from a first end portion (e.g. bottom portion) to a second end portion (e.g., top portion) of the absorber 202, wherein it may directly contact with solvent stream 222 (e.g., amine solvent (e.g., NAS)). In brief, NAS chemically absorbs $CO_2$ from the untreated flue gas 30 and leaves at the bottom of the absorber 202. The solvent stream 222 may be provided counter-current to the flow of the untreated flue gas 30. For example, the untreated flue gas 30 may flow generally upward through the absorber 202, whereas the solvent stream 222 may flow generally downward through the absorber 202. It should be noted that the solvent stream 222 is generally depleted or lean in $CO_2$ (e.g., $CO_2$-lean solvent stream 222L) when entering the absorber 202, whereas the solvent stream 222 gradually increases in concentration of $CO_2$ and becomes $CO_2$-rich before exiting the absorber 202 as a $CO_2$-rich solvent stream 222R. As such, the solvent stream 222 may scrub (e.g., remove) $CO_2$ from the untreated flue gas 30 in the absorber 202. Over time, particularly due to the absorption reaction in the absorber 202, the solvent stream 222 (e.g., 222L, 222R) may degrade and become (or be referred to as) the outflow stream 44. As discussed above, the outflow stream 44 includes a mixture of cyclic amine and degraded amines (e.g., methyl amine, dimethylamine, ethyl amine, diethyl amine). Although $CO_2$ is provided as an example of undesirable gas being scrubbed from the untreated flue gas 30, the absorber 202 may be configured to absorb one or more other undesirable gases, as noted above. Accordingly, in certain embodiments, the rich solvent stream 222R may be an undesirable gas-rich solvent stream 222R and the lean solvent stream 222L may be an undesirable gas-lean stream 222L, wherein the undesirable gas may include the carbon oxides ($CO_x$) (e.g., carbon dioxide ($CO_2$) and carbon monoxide (CO)), sulfur oxides ($SO_x$), nitrogen oxides ($NO_x$), or any combination thereof. The reaction between the solvent stream 222 and untreated flue gas 30 is an exothermic reaction. Accordingly, the absorber 202 may employ cooling methods (e.g., interstage cooler systems 218, 220 and a wash system 10) to cool the absorber 202 and generate a treated flue gas 46, wherein the treated flue gas 46 may include $CO_2$ amount substantially less than the untreated flue gas 30.

In general, the absorber 202 may include sections with packing or trays (e.g., beads held between upper and lower screens). It should be noted that the packing may be random or structured. Accordingly, the untreated flue gas 30 may first flow into the absorber 202 and come into contact with a first packing section 201 (e.g., absorption stage), which resides at a lowest portion of the absorber 202. The interstage cooler system 218 may include a pump 214 and a heat exchanger 216 and may be coupled to the first packing section (e.g., absorption stage). Accordingly, the interstage cooler 218 may employ a cooling medium 218a such as water or air that may be pumped by pump 214 and cooled by the heat exchanger 216 to cool the absorber 202 as the reaction between the solvent stream 222 and untreated flue gas 30 occurs at the first packing section 201 (e.g., absorption stage). As solvent stream 222 scrubs the untreated flue gas 30, a first partially treated flue gas (e.g., partially $CO_2$ depleted stream) may be generated, wherein the first partially treated flue gas exhibits $CO_2$ amounts less than the untreated flue gas 30. Furthermore, due to the exothermic reaction between the solvent stream 222 and untreated flue gas 30, the first partially treated flue gas may also include residual amine components from the solvent stream 222. For example, the residual amines may include a mixture of cyclic amines and degraded amines. As such, the first partially treated flue gas 36a may be directed upwards into the absorber 202 and interact with a second packing section 203 in order to increase $CO_2$ loading from the upward flue gas into the downward amine solvent. This leads to entrained amines in the first partially treated flue gas 36a as it travels upward in absorber 202 (e.g., absorption stage) coupled to the interstage cooler 220, which resides at a middle portion of the absorber 202.

The first partially treated flue gas may come into contact with the second packing section 203 (e.g., second absorption stage) coupled to the interstage cooler 220, which may include a pump 214 and a heat exchanger 216. The interstage cooler 220 may employ a cooling medium 220a, such as water or air, that may be pumped by pump 214 and cooled by the heat exchanger 216. The cooling medium 220a then cools the absorber 202 as the reaction between the solvent stream 222 and first partially treated flue gas occurs. As solvent stream 222 scrubs the first partially treated flue gas, a second partially treated flue gas (e.g., partially $CO_2$ depleted stream) may be generated, wherein the second partially treated flue gas exhibits $CO_2$ amounts less than the first partially treated flue gas. Furthermore, due to the exothermic reaction between the solvent stream 222 and untreated flue gas 30, the second partially treated flue gas 36b may also contain residual amines from the solvent stream 222. For example, the residual amines may include a mixture of cyclic amines and degraded amines. In certain embodiments, the absorber 202 may include any number of packing sections (e.g., absorption stages), such as 1, 2, 3, 4, 5, or more packing sections (e.g., absorption stages) in series through the absorber 202. Accordingly, after flowing through the packing sections (e.g., absorption stages), the second partially treated flue gas 36b flows upwardly into the wash system 10 at an upper portion of the absorber 202. In some embodiments, the wash system 10 may be separate from the absorber 202, such as outside of the absorber 202 along a flow path of the treated flue gas (e.g., second partially treated flue gas).

In general, the wash system 10 may be utilized to remove residual amines from the second partially treated flue gas (e.g., partially treated flue gas 36). The wash system 10 may include a plurality of wash nozzles, a plurality of perforated tubes, a grid of wash jets, or a combination thereof, for each wash section or stage. Accordingly, the wash system 10 may be coupled to a cooling system to provide a cold-water supply for the process. Accordingly, one or more water wash columns of the wash system 10 may receive the second partially treated flue gas via an inlet port, wherein the cold water may be circulated in the one or more water wash columns to remove residual amines, thereby generating the outflow stream 44 and treated flue gas 46 as described in FIG. 1. For example, the cold water may be sprayed within the one or more water wash columns. As such, the treated flue gas 46 may include amine amounts substantially less (e.g., substantially amine-free) than the second partially treated flue gas. In some embodiments, the treated flue gas 46 may be subsequently provided to additional water washes (e.g., second water wash) and/or acid wash systems prior to being released into the atmosphere. Concomitantly, the wash stream 40 may be directed to the ECT 16 for further processing, wherein the wash stream 40 may be separated to generate a outflow stream. The outflow amine stream may be subsequently directed to the appendix stripper system 100, such that the appendix stripper system 100 may reclaim cyclic amines to generate reclaimed amine stream 104. In some embodiments, the reclaimed amine stream 104 may be combined with one or more streams. For example, the reclaimed amine stream 104 may be combined with the $CO_2$-lean solvent stream 222L supplied to the absorber 202. In other embodiments, the reclaimed amine stream (e.g., 239, 241, 243, and 245) may be combined with other streams (e.g., streams 44, 222a, 239) respectively.

Because the untreated flue gas 30 reacts with solvent stream 222, the absorption reaction generates the $CO_2$-rich solvent stream 222R. In other words, the $CO_2$-lean solvent stream 222L supplied to the absorber 202 absorbs the $CO_2$ from the untreated flue gas 30, thereby becoming substantially rich in $CO_2$ and becoming the $CO_2$-rich solvent stream 222R. The absorption reaction is an exothermic reaction that generates considerable heat and may result in degradation of the solvent stream 222, such that the solvent stream 222 (e.g., 222L, 222R) degrades and becomes contaminated as the outflow stream 44. Thus, the solvent stream 222 may also be described as the outflow stream 44, particularly after the absorber 202. Accordingly, the $CO_2$-rich solvent stream 222R (e.g., outflow stream 44) is outputted via the absorber 202 via an outlet port. The $CO_2$-rich solvent stream 222R (e.g., outflow stream 44) may be directed to lean/rich heat exchanger 205, wherein the outflow stream 44 is heated against solvent stream 222 (i.e., heated by cross exchanging heat with the regenerated NAS (e.g., reclaimed amine stream 239, 241, 245). It should be noted that the lean/rich heat exchanger 205 may be at the intersection of the two flow paths for heat exchange therebetween, such as by transferring heat from the return flow path to the supply flow path.

Accordingly, the solvent stream 222 may be directed to the absorber 202, while the pre-heated outflow stream 44 may be directed to regenerator 206.

In general, the regenerator 206 is configured to remove carbon oxides from a stream (e.g., outflow stream 44) of the solvent flow and produce a captured carbon oxide flow (e.g., (e.g., a $CO_2$ gas product 228). The regenerator 206 may be positioned downstream from the lean/rich heat exchanger 205, wherein the regenerator 206 may receive the $CO_2$-rich solvent stream 222R (e.g., outflow stream 44) via an inlet port. The regenerator 206 may also be in direct communication with the reboiler 208, wherein the reboiler 208 is fluidly coupled with a bottom portion of the regenerator 206. Accordingly, the reboiler 208 may utilize steam 32 to generate heat needed for the regenerator 206, thereby producing condensate 34 as a byproduct in the process. The $CO_2$-rich solvent stream 222R (e.g., outflow stream 44) may be received by the regenerator 206, wherein the outflow stream 44 may flow downwards into the regenerator 206, which is countercurrent with respect to a vapor that may be generated by the reboiler 208. The vapor may be generated by heating a portion of the outflow stream 44, thereby generating $CO_2$/water vapor stream 224 and $CO_2$ depleted (or lean) solvent stream 226. The reboiler 208 may be positioned to receive the $CO_2$ depleted solvent stream 226, wherein the $CO_2$ depleted solvent stream 226 may be further heated by the reboiler 208 to remove additional $CO_2$ and further generate $CO_2$/water vapor stream 224. The endothermic heat input provided by the regenerator 206 and/or reboiler 208 breaks the chemical bonds between the rich NAS and the $CO_2$, which leaves at the top of the regenerator 206 as $CO_2$/water vapor stream 224. It should be noted that water (e.g., water vapor, vapor) may be entrained in the generated $CO_2$/water vapor stream 224 that exits regenerator 206. Accordingly, integration of lean/rich heat exchanger 205, reboiler 208, and reflux condenser 210 minimizes water entrainment and enable desired $CO_2$ capture rate and purity in downstream products (e.g., a $CO_2$ gas product 228). The reboiler 208 may output the $CO_2$ vapor stream 224 via a gas line back to the regenerator 206, such that it may exit the regenerator 206 accordingly. It should be noted that the $CO_2$/water vapor stream 224 may include amine amounts (ppm-level) substantially less than the outflow stream 44. Furthermore, the reboiler 208 and/or the regenerator 206 may also generate regenerated solvent stream 222a (e.g., $CO_2$-lean solvent stream 222L). In general, the regenerated solvent stream 222a (e.g., $CO_2$-lean solvent stream 222L) includes $CO_2$/water amounts substantially less than the $CO_2$/water vapor stream 224. In one embodiment, the regenerated solvent stream 222a may be received by pump 214 and recycled back to the absorber 202, such that it may be utilized as the solvent stream 222 accordingly.

In certain embodiments as shown in FIG. 4, one or more appendix stripper systems 100 (e.g., appendix stripper system 231, appendix stripper system 233, appendix stripper system 235, and appendix stripper system 237) may be disposed at one or more locations throughout the carbon capture plant 12 to treat a stream (e.g., outflow stream 44 of FIGS. 2 and 3). It should be noted that, in some embodiments, the appendix stripper systems 231, 233, 235, and 237 are meant to be exemplary of the appendix stripper system of FIGS. 2 and 3. In some embodiments, the location of an individual appendix stripper system 100 (e.g., appendix stripper systems 231, 233, 235, and 237) may affect the resulting composition of the one or more streams generated by the individual appendix stripper system 100. The different compositions of streams are discussed in further detail below with reference to Table 2. For example, the appendix stripper system 100 (e.g., appendix stripper system 231) may be positioned downstream from the regenerator 206 along a return flow path of the solvent from the regenerator 206 to the absorber 202, such that it may receive the solvent stream 222a (e.g., $CO_2$-lean solvent stream 222L) having various components. It should be noted that in some embodiments, solvent stream 222 (e.g., 222a, 222R, 222L) may exhibit a composition similar to the outflow stream 44 of FIGS. 1 and 3, and thus the solvent stream 222a may be referred to as the outflow stream 44. For example, the solvent stream 222 may include a mixture of the NAS components (e.g., cyclic amine), degraded amines, water, and other components. For example, the appendix stripper system 231 may operate at high temperatures and high pressures. For example, the appendix stripper system 231 may operate at about 1.5 barg to about 2.5 barg at about 75° C. to about 90° C. The appendix stripper system 231 may receive a portion of the solvent stream 222a and separate the components (e.g., degraded amines) from the NAS (e.g., cyclic amine) to generate the waste stream 114 and a reclaimed amine stream 239 (e.g., 222L, 222a with substantially reduced components). In other words, the reclaimed amine stream 239 corresponds to the regenerated solvent stream 222a (e.g., $CO_2$-lean solvent stream 222L) substantially free or reduced in content of the components (e.g., degraded amines). The reclaimed amine stream 239 may include lean NAS at a higher weight percent relative to water, followed by degraded components. For example, the relative amounts of the reclaimed amine stream 239 may include cyclic amine wt. %>water wt. %>degraded components. Accordingly, the pump 214 may receive the reclaimed amine stream 239 and route it to the lean/rich heat exchanger 205, such that it can be recycled back to the absorber 202 to be used as solvent stream 222.

In certain embodiments, the appendix stripper system 100 (e.g., appendix stripper system 233) may be positioned downstream from the pump 214 (i.e., pump 214 downstream from the regenerator 206). The appendix stripper system 233 may operate at high temperatures and high pressures. For example, the appendix stripper system 233 may operate at pressures of about 3 barg to about 7 barg and at temperatures of about 75° C. to about 90° C. The appendix stripper system 233 may receive a portion of the solvent stream 222a from the pump 214 and separate the degraded amines from the NAS (e.g., cyclic amine) to generate the waste stream 114 and reclaimed amine stream 241. The reclaimed amine stream 241 may include lean NAS at a higher weight percent relative to water, followed by degraded components. For example, the relative amounts of the high purity stream 241 may include cyclic amine wt. %>water wt. %>degraded components. Accordingly, the reclaimed amine stream 241 may be directed to the lean/rich heat exchanger 205 such that it can be recycled back to the absorber 202 to be used as solvent stream 222.

In certain embodiments, the appendix stripper system 100 (e.g., appendix stripper system 235) may be positioned between the lean/rich heat exchanger 205 and the regenerator 206 along the flow path of the $CO_2$-rich solvent stream 222R. The appendix stripper system 235 may operate at high temperatures and high pressures. The appendix stripper system 235 may receive a portion of the pre-heated $CO_2$-rich solvent stream 222R (e.g., outflow stream 44) from the lean/rich heat exchanger 205 and separate the components (e.g., degraded amines) from the NAS (e.g., cyclic amine) to generate the waste stream 114 and reclaimed amine stream 243 (e.g., $CO_2$-rich solvent stream 222R substantially free or reduced in the components). The reclaimed amine stream 243 may include lean NAS at a higher weight percent relative to water, followed by degraded components. For example, the relative amounts of the reclaimed amine stream 243 may include cyclic amine wt. %>water wt. %>degraded components. Accordingly, the reclaimed amine stream 243 (e.g., $CO_2$-rich solvent stream 222R substantially free or reduced in the unwanted components) may be directed to the regenerator 206 and be processed as indicated above to generate the regenerated solvent stream 222a (e.g., $CO_2$-lean solvent stream 222L), such that it can be recycled back to the absorber 202 for additional absorption of the $CO_2$ from the untreated flue gas 30. The appendix stripper system 235 arranged upstream of the regenerator 206 may reduce or eliminate degraded amines from the entering the regenerator 206, thereby improving the quality of the $CO_2$ in the reboiler 208 and the $CO_2$ product stream 228. Improving the quality of the solvent stream 222a in the regenerator 206 and the reboiler 208 may facilitate more energy directed to release of $CO_2$ from the solvent stream 222a rather than directed to boiling of degraded amines.

In certain embodiments, the appendix stripper system 100 (e.g., appendix stripper system 237) may be positioned between the water wash system 14 and the carbon capture plant 12. The appendix stripper system 237 may be as illustrated in FIG. 3, and the reclaimed amine stream 245 may feed into the $CO_2$-lean solvent stream 222L or the $CO_2$-rich solvent stream 222R. It should be noted that the locations of the appendix stripper systems 100 (e.g., appendix stripper systems 231, 233, 235, and 237) of the carbon capture system 200 are meant to be exemplary and can be integrated at any location of the carbon capture system 200 to facilitate purification of the solvent stream 222 in the carbon capture system 200. For example, the carbon capture system 200 may employ the individual appendix stripper system 231, the individual appendix stripper system 233, the individual appendix stripper system 235, and/or one or more additional appendix stripper system 237 at any locations throughout the $CO_2$ capture plant 12, or any combination thereof. The appendix stripper system 100 may receive only a portion (e.g., slip stream) of the solvent stream 222 in the carbon capture system 200 that flows by the appendix stripper system 100. For example, the appendix stripper system 100, when engaged, may process less than 25%, less than 20%, less than 15%, less than 10%, less than 5%, or less than 2% of the solvent stream 222. Table 2 below provides examples of the relative composition of the stream received by the appendix stripper system 100 in the various locations described above, the temperature range of the stream received by the appendix stripper, and the pressure range of the stream received by the appendix stripper.

TABLE 2

Example compositions of streams received by an appendix stripper.

| Appendix stripper ref. | Relative composition (wt %) | Temp. range (° C.) | Pressure range (bar gauge) |
|---|---|---|---|
| 231 | cyclic amine > water > degraded amine | 70-96 | 1.5-5.5 |
| 233 | cyclic amine > water > degraded amine | 70-96 | 3.0-7.5 |
| 235 | cyclic amine > water > degraded amine | 33-50 | 1.8-2.6 |
| 237 | water > cyclic amine > degraded amine | 5-35 | 1.5-3.0 |

As such, the techniques described herein advantageously provide various configuration options (e.g., a plug-and-play unit operation) for the positioning of the appendix stripper system 100 at one or more locations as part of the carbon capture system 200 to enable partial or full reclamation of the NAS components (e.g., cyclic amine within reclaimed amine stream 104). The plug-and-play unit operation can be interfaced with the carbon capture process per plant demand. The appendix stripper system 100 may also operate at various conditions (e.g., low pressure, high pressure, low temperature, high temperature). For example, positioning the appendix stripper system 100 downstream of the regenerator 206 utilizes high temperature at the regenerator 206 bottom, and thus, reduces the amount of heat and/or steam input to the appendix stripper 101. The appendix stripper system 100 also facilitates meeting threshold regulatory gas emissions into the atmosphere (i.e., reduction in amine emissions in the treated flue gas 46) and reduces the amount of degraded amines/degraded components that are recycled to the $CO_2$ capture plant 12.

The $CO_2$/water vapor stream 224 may be directed to a reflux condenser 210 (e.g., cooler) and generate a cooled $CO_2$/water vapor stream 224a. Accordingly, the cooled $CO_2$/water vapor stream 224a may be directed to a reflux drum 212. The reflux drum 212 may receive the cooled $CO_2$/water vapor stream 224a and separate $CO_2$ gas from condensed water and residual amines. Accordingly, the reflux drum 212 may generate the $CO_2$ gas product 228. The $CO_2$ gas product 228 may be subsequently directed to a compressor and a dryer unit for compression and a storage unit (e.g., tank, reservoir, pipeline, etc.) for storage and/or transportation. It should be noted that the integration of the appendix stripper system 100 (e.g., appendix stripper systems 231, 233, 235, 237) allows a reduction in the amount of unwanted components in the $CO_2$ gas product 228. The reflux drum 212 may also generate a condensed water/amine stream 230 based on the cooled $CO_2$/water vapor stream 224, which may be redirected back to the regenerator 206. The condensed water/amine stream 230 cools down the $CO_2$ vapor stream liberated by the regenerator 206, and therefore, reduces the utility load of the reflux condenser 210.

In the illustrated embodiment, the controller 20 may be configured to control all aspects of the carbon captures system 200, wash system 10, and/or appendix stripper system 100 (e.g., 231, 233, 235, 237). The controller 20 may send feed-forward and feedback control signals to the appendix stripper system 100. For example, the controller 20 is configured to receive sensor feedback from sensors 18 coupled to the $CO_2$ capture plant 12, water wash system 14, ECT 16, appendix stripper system 100 (e.g., 231, 233, 235, 237), one or more streams generated by the carbon capture system 200, one or more streams generated by the wash system 10, one or more streams generated by the appendix stripper systems 100 (e.g., 231, 233, 235, 237) and/or additional components of the wash system 10 and control the same equipment based on the sensor feedback, operating modes, user input, computer models, or any combination thereof.

In certain embodiments, the controller 20 is configured to control operation of the carbon captures system 200 and/or appendix stripper systems 100 (231, 233, 235, 237) such as by controlling modes of operation (e.g., controlling appendix stripper system 100 to increase or decrease heat provided to the outflow stream 44, adjust flow rate/temperature of outflow stream 44, adjust operations of the appendix stripper system 100, adjust flow rates of one or more streams received and/or generated by the appendix stripper system 100, adjust operations of wash system 10, adjust pump rate of pumps 214, adjust temperatures of intercoolers 216, 218, etc.

For example, the controller 20 is configured to receive sensor feedback from sensors 18 coupled to the absorber 202, wash system 10, appendix stripper system 100, and/or additional components of the wash system 10 and control the same equipment based on the sensor feedback, operating modes, user input, computer models, or any combination thereof. The carbon capture system 200 described herein may also include various sensors 18 positioned along solvent flow paths, gas flow path, and coolant flow paths. For example, the sensors 18 may include temperature sensors, pressure sensors, flow rate sensors, gas composition sensors (e.g., to determine amine concentration in gas phase in treated flue gas 46 and/or $CO_2$ gas product 228), liquid composition sensors (e.g., to determine amine concentration in liquid phase), or any combination thereof.

Figure 5:
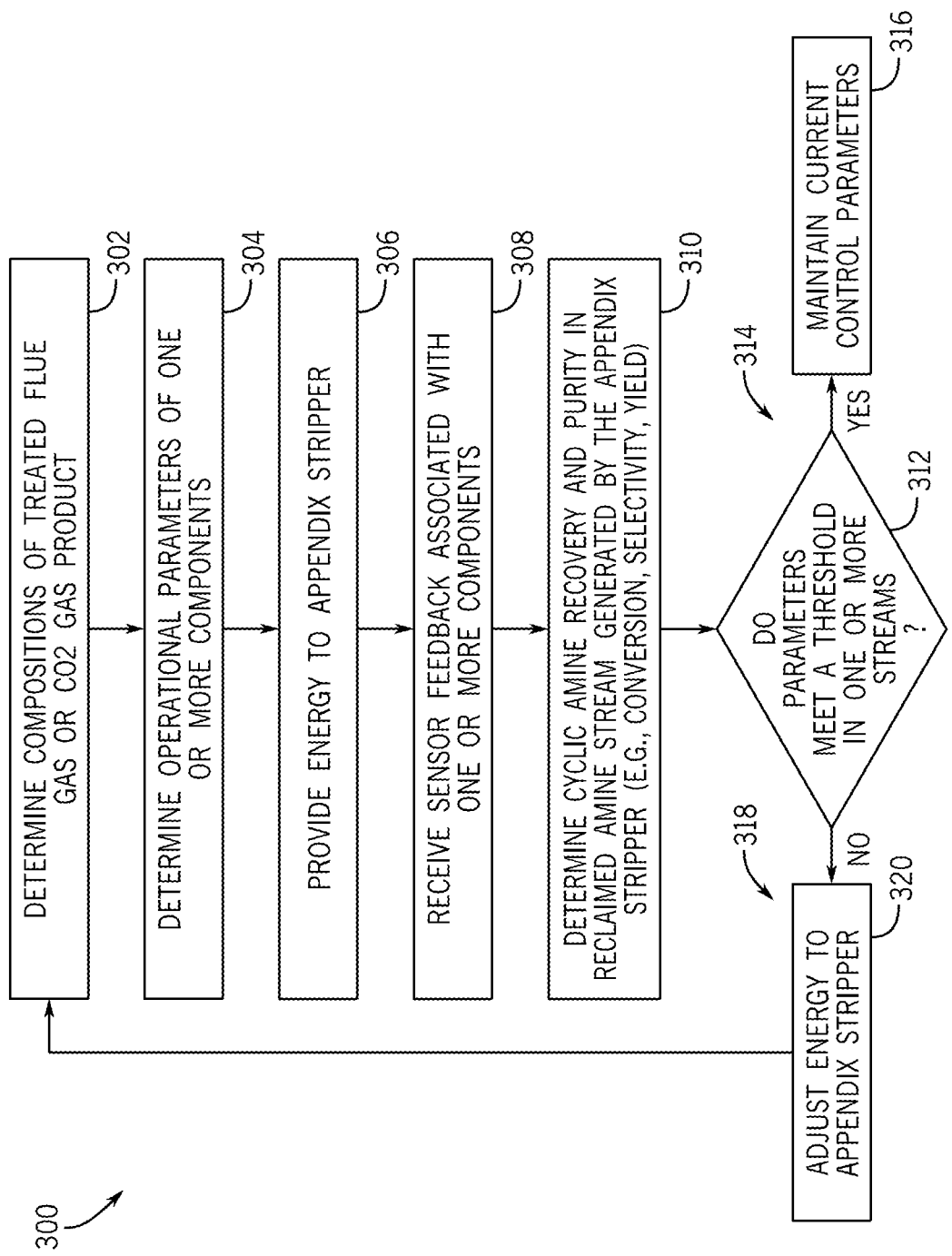
FIG. 5 is a flowchart of an embodiment of a process for operation of the appendix stripper system coupled to the systems of FIGS. 1-4, in accordance with present disclosure.

FIG. 5 is a flowchart of an embodiment of a process 300 for operation of the appendix stripper system 100 coupled to the systems of FIGS. 1-4. In certain embodiments, the process 300 is a dynamic control process that employs feed forward and feedback controllers. The process 300 may be performed by the carbon capture system 200, wash system 10, appendix stripper system 100, controller 20, a computing device, or any other suitable computing device(s) or controller(s). Furthermore, the blocks of the process 300 may be performed in the order disclosed herein or in any suitable order. For example, certain blocks of the process 300 may be performed concurrently or consecutively. In addition, in certain embodiments, at least one of the blocks of the process 300 may be omitted. Further, it should be noted, that the carbon capture system 200, wash system 10, appendix stripper system 100, and/or controller 20 may iteratively perform the blocks outlined in process 300.

At block 302, the controller 20 may determine composition of the treated flue gas 46 and/or $CO_2$ gas product 228. For example, sensors 18 may provide sensor feedback using gas composition sensors to determine compositional information (e.g., amount or type of degraded amines, NAS components (e.g., cyclic amine), degraded components, water).

At block 304, the controller 20 may determine operational parameters of one or more components of the carbon capture system. For example, the components that contact amines (e.g., amine solvent, outflow stream 44, reclaimed amine stream 104, waste stream 114, partially treated flue gas 36) may include the water wash system 14, ECT 16, appendix stripper 101, regenerator 206, and absorber 202. Accordingly, the controller 20 may determine current operational parameters (e.g., flow rate, temperature, energy provided to each component) of the one or more components associated with the processing of amines.

At block 306, the controller 20 may provide energy to the appendix stripper system 100. For example, the controller 20 may utilize the communication circuitry 28 to communicate with the appendix stripper system 100 to operate (e.g., control, activate, turn on) the appendix stripper 101 and/or the reboiler 102 coupled to the appendix stripper 101. The controller 20 may have instructions 26 stored on the memory 24 to facilitate operation of the appendix stripper system 100.

At block 308, the controller 20 may receive sensor feedback via sensors 18 associated with the one or more components at block 304. For example, the controller 20 may receive sensor feedback and/or utilize analytical measurements to obtain information such as compositional information (e.g., gas composition, liquid composition), temperature, density, flow rate, pH, molarity, or a combination thereof, associated with one or more streams in one or more components to obtain information regarding solvent amounts (e.g., amount or type of degraded amines, NAS (e.g., cyclic amine), degraded components, water).

At block 310, the controller 20 may determine cyclic amine recovery in reclaimed amine stream 104 generated by the appendix stripper 101. For example, sensors 18 may provide information regarding the conversion, selectivity, and yield associated with cyclic amine in the reclaimed amine stream 104. For example, the conversion may provide information regarding how much of the cyclic amine from the outflow stream 44 is converted into the reclaimed amine stream 104 based on the composition of the outflow stream 44. The selectivity may provide information regarding how selective the current operating conditions in the appendix stripper system 100 are at separating cyclic amine to generate the reclaimed amine stream. For example, the yield may provide information as to the amount of cyclic amine in the reclaimed amine stream.

At block 312, the controller 20 may determine whether the parameters (e.g., composition, temperature, density, flow rate, pH, molarity) meet a threshold (e.g., threshold range between upper and lower thresholds). For example, the threshold may be based on previous sensor feedback acquired by sensors 18. In some embodiments, the threshold may be determined by determining an amine emission amount from the treated flue gas 46, $CO_2$ gas product 228, and/or high purity amine 104.

At block 314, if the controller 20 determines that the parameters meet the threshold value (e.g., within threshold range between upper and lower thresholds), the controller may maintain the current control parameters, as described in block 316. In some embodiments, the controller 20 may modify operations of the appendix stripper system 100 by adjusting operational parameters of the reboiler 102 to reduce energy consumption if the cyclic amine amount in the reclaimed amine stream 104 is more than or equal to the threshold value. Accordingly, the process 300 may restart and begin at block 302.

At block 318, if the controller 20 determines that the parameters do not meet the threshold value (e.g., cyclic amine amounts in the reclaimed amine stream 104 are less than the threshold value and/or monitoring water quality in one or more streams generated by ECT 16, amines saturation in the wash system 10 (i.e., water wash recycling loop), amine-related measurements of one or more streams (e.g., amine basicity, amine pH, amine molarity)), then the controller 20 may adjust parameters of the appendix stripper system 100. For example, the controller 20 may increase the energy consumption (e.g., provide more heat or steam input to enhance separation of degraded components from NAS components) of the appendix stripper 101 and/or reboiler to 102 to promote conversion, yield, and selectivity of cyclic amine in the reclaimed amine stream 104. In this way, more heat may be provided to the appendix stripper system 100 to increase cyclic amine conversion, yield, and selectivity in the appendix stripper 101 (e.g., processes associated with separating NAS components from degraded components/degraded amines) and subsequently increase purity of reclaimed amine stream 104. It should be noted that the process 300 may be repeated until the parameters meet the threshold value. Furthermore, it should be noted that analytical measurements (e.g., sensor feedback generated by sensors 18) may be acquired batch-type or continuous-type. Accordingly, the processes described herein enable partial or full reclamation of NAS (e.g., cyclic amine) as part of the reclaimed amine stream 104.

Examples

TABLE 3

Process simulation runs for cyclic amine reclamation process using an appendix stripper.

| Stripper duty (kilowatt (kW)) | Feed stream temperature (° C.) | Feed stream total flow (kilograms/hour (kg/hr)) | Cyclic amine recovery from feed stream (weight %) | Cyclic amine purity in bottom stream on dry basis (weight %) | Water amount in top stream (weight %) |
|---|---|---|---|---|---|
| 200 | 35 | 1987 | 99.8 | 99.7 | 3.9 |
| 600 | 90 | 1987 | 99.0 | 99.8 | 16.5 |
| 400 | 35 | 3338 | 99.7 | 99.7 | 6.1 |
| 200 | 90 | 3338 | 99.7 | 99.6 | 5.6 |
| 600 | 35 | 6040 | 99.9 | 99.4 | 1.2 |
| 200 | 90 | 6040 | 99.99 | 98.3 | 0.2 |
| 400 | 90 | 11445 | 99.9 | 99.5 | 1.7 |
| 800 | 90 | 18651 | 99.9 | 98.9 | 1.6 |

Table 3 is an example of process simulation runs that were performed to validate the reclamation method of cyclic amine as part of the reclaimed amine stream 104. In the illustrated table, simulation data shows that cyclic amine (e.g., purified amine stream) can be recovered with purity, yield, and selectivity at various stripper feed temperatures, flow rates, amine concentrations, and water concentrations. For example, the cyclic amine may be recovered from a feed stream at amounts greater than about 50 wt. %, greater than about 60 wt. %, greater than 70 wt. %, greater than 80 wt. %, greater than 90 wt. %, or greater than 99 wt. %. For example, cyclic amine may be recovered from a feed stream at amounts such as about 99.1 wt. %, about 99.2 wt. %, about 99.3 wt. %, about 99.4 wt. %, about 99.5 wt. %, about 99.6 wt. %, about 99.7 wt. %, about 99.8 wt. %, about 99.9 wt. %, or about 100 wt. %. In one example, the appendix stripper may recover about 99.8 grams (g) of the reclaimed amine stream 104 from a 100 g of a feed stream.

Table 3 also includes cyclic amine purity in the bottom stream (e.g., reclaimed amine stream 104) on a dry basis in wt. %. It should be noted that on dry basis refers to total amount of dry feed (e.g., reclaimed amine stream 104) in the bottom stream output without water. Accordingly, the cyclic amine purity in the bottom stream on dry basis may be at amounts greater than 50 wt. %, greater than about 60 wt. %, greater than 70 wt. %, greater than 80 wt. %, greater than 90 wt. %, or greater than 99 wt. %. For example, the cyclic amine amounts in the bottom stream on dry basis may be about 98.0 wt. %, 98.1 wt. %, 98.2 wt. %, 98.3 wt. %, 98.4 wt. %, 98.5%, 98.6 wt. %, 98.7 wt. %, 98.8 wt. %, 98.9 wt. %, 99 wt. % 99.1 wt. %, 99.2 wt. %, 99.3 wt. %, 99.4 wt. %, 99.5%, 99.6 wt. %, 99.7 wt. %, 99.8 wt. %, 99.9 wt. %, or about 100 wt. %. The required reboiler duty is within 400 kW, which is a small fraction of the regeneration demand of large $CO_2$ capture plants with higher reboiler duties. Accordingly, Table 2 demonstrates that implementation of the appendix stripper system 100 advantageously recovers cyclic amine as part of the reclaimed amine stream 104. Furthermore, it should be noted that the reclamation system may be used in various parts of the carbon capture system to remove degraded amines and return reclaimed cyclic amines to the circulated solvent. In this way, removing the degraded amines provides several advantages, including but not limited to increasing the capture efficiency of the solvent stream, casing circulation and phase control of solvent through the carbon capture system, and decreasing post-capture processing of the released gases from the regenerator 206. Reducing the degraded amines in a solvent stream via one or more of the appendix stripper systems described above may reduce or eliminate the energy penalty to the reboiler 208 from boiling the degraded amines. Moreover, solvent streams having a mixture of the cyclic amine and degraded amines may have different solubility and phase behavior, boiling point, density, viscosity, heat capacity, and other properties compared to the NAS solvent system as designed and modeled. Removing the degraded amines from the solvent stream via the appendix stripper systems described above may maintain alignment of the properties of the NAS solvent system with the design and operating procedures for the carbon capture system, thereby improving the predictability, maintenance, and operating costs of the carbon capture system.

A technical effect of the disclosed embodiments includes an appendix stripper system to separate NAS components (e.g., cyclic amine) from degraded components/degraded amines in an amine containing stream as part of a carbon capture system. The appendix stripper system may employ an appendix stripper and a reboiler to provide heat and/or steam input to facilitate separation of low boiling components (e.g., degraded amines, degraded components) from high boiling components (e.g., cyclic amine, ethers) in the amine containing stream. This generates a reclaimed amine stream that contains primarily the NAS components and a waste gas stream, wherein the reclaimed amine stream is recycled for the carbon capture processes. In this way, removal of the low boiling components as part of the waste gas stream reduces contamination of $CO_2$ product streams (i.e., increases purity of $CO_2$ product streams by reducing amine slip), reduces contamination within certain components (e.g., regenerator), and reduces recycling of the unwanted components back to the $CO_2$ capture plant. Accordingly, the techniques described herein facilitate purification techniques to reclaim the NAS components that can be recycled back to the carbon capture system for reuse and enable a reduction in energy consumption.

The subject matter described in detail above may be defined by one or more clauses, as set forth below.

A system includes a solvent-based carbon capture system, wherein the solvent-based carbon capture system includes an absorber configured to absorb carbon oxides ($CO_x$) from a gas flow into a solvent of a solvent flow to produce a treated gas flow. The system includes a regenerator configured to strip the carbon oxides from the solvent flow to produce a captured carbon oxides flow. The system further includes a wash system configured to wash the treated gas flow using water. The system also includes an appendix stripper system configured to separate a outflow stream into a reclaimed amine stream and a waste stream, wherein the outflow stream comprises the solvent and degraded components of the solvent, and the waste stream has a greater concentration of the degraded components than in the reclaimed amine stream.

The system of the preceding clause, wherein the appendix stripper system includes an appendix stripper, wherein the appendix stripper is configured to separate the reclaimed amine stream from the waste stream and a reboiler, wherein the reboiler is configured to provide heat to the appendix stripper to separate the degraded components from the solvent.

The system of any preceding clause, wherein the degraded components comprise cyclic amine, methylamine, dimethylamine, ethyl amine, diethylamine, formaldehyde, acetaldehyde, acetone, ethers, or a combination thereof.

The system of any preceding clause, wherein the appendix stripper system operates continuously or in a batch-mode.

The system of any preceding clause, wherein the appendix stripper system is positioned downstream from the regenerator along a return flow path of the solvent from the regenerator to the absorber.

The system of any preceding clause, wherein the appendix stripper system is positioned downstream from a heat exchanger along a supply flow path of the solvent from the absorber to the regenerator.

The system of any preceding clause, wherein the appendix stripper system is positioned downstream from an emissions control technology (ECT) coupled to a water wash, and the ECT is configured to separate the outflow stream and the water from a wash stream of the water wash.

The system of any preceding clause, wherein the carbon oxides in the gas flow comprises carbon dioxide, and the appendix stripper system reduces an amount of the one or more degraded components in the reclaimed amine stream circulated through a carbon dioxide ($CO_2$) capture plant having the absorber and the stripper.

The systems of any preceding clause, wherein the absorber is configured to absorb the $CO_2$ from the gas flow into the solvent flow to produce a $CO_2$-rich solvent flow and to produce the treated gas flow, wherein the regenerator is configured to strip the $CO_2$ from the $CO_2$-rich solvent flow to produce a $CO_2$-lean solvent flow and to produce the captured carbon oxides flow comprising the $CO_2$.

The system of any preceding clause, wherein the one or more degraded components comprises degraded amines, and the appendix stripper system is configured to remove at least equal to or greater than 50 percent of the degraded amines from the outflow stream.

The system of any preceding clause, wherein the solvent of the outflow stream comprises a cyclic amine and a degraded amine, wherein the degraded amine exhibit a lower boiling point relative to the cyclic amine.

A method includes absorbing carbon dioxide from a gas flow into a solvent of a solvent flow in an absorber of a solvent-based carbon capture system to produce a treated gas flow. The method includes stripping the carbon dioxide from the solvent of the solvent flow in a regenerator of the solvent-based carbon capture system to produce a captured carbon dioxide flow. The method also includes washing the treated gas flow using water in a wash system. The method further includes separating a outflow stream into a purified amine stream and a waste gas stream via an appendix stripper system, wherein the outflow stream comprises the solvent having one or more components at least partially caused by degradation of the solvent, and the waste gas stream has the one or more components in a higher concentration than in the purified amine stream.

The method of the preceding clause, including separating a plurality of components within the outflow stream based on properties of the components, wherein the properties comprise a boiling point, a molecular weight, a solubility, or a combination thereof.

The method of any preceding clause, wherein the solvent of the outflow stream comprises cyclic amine and the one or more components of the outflow stream comprises degraded amines, wherein the degraded amines exhibit lower boiling points relative to the cyclic amine.

The method of any preceding clause, wherein the boiling point of the degraded amines is less than 60° C.

The method of any preceding clause, wherein the molecular weight of the degraded amines is less than or equal to 80 grams/mole (g/mol).

The method of any preceding clause, wherein the purified amine stream is recovered at amounts greater than about 99 weight (wt.) %.

A system includes a controller having a processor, a memory, and instructions stored on the memory and executable by the processor to control a solvent-based carbon capture system to control absorbing carbon dioxide from a gas flow into a solvent of a solvent flow in an absorber of a solvent-based carbon capture system to produce a treated gas flow. The instructions include stripping the carbon dioxide from the solvent of the solvent flow in a regenerator of the solvent-based carbon capture system to produce a captured carbon dioxide flow. The instructions also include washing the treated gas flow using water in a wash system. The instructions further include separating a outflow stream into a purified amine stream and a waste gas stream via an appendix stripper system, wherein the outflow stream comprises the solvent having one or more components at least partially caused by degradation of the solvent, and the waste gas stream has the one or more components in a higher concentration than in the purified amine stream.

The system of the preceding clause, wherein the controller is configured to control the appendix stripper system to adjust a temperature of an appendix stripper of the appendix stripper system.

The system of any preceding clause, wherein the controller is configured to maintain the temperature of the appendix stripper system below a threshold temperature to increase a concentration of cyclic amine in the purified amine stream and reduce energy consumption of the appendix stripper system.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a solvent-based carbon capture system, wherein the solvent-based carbon capture system comprises:
an absorber configured to absorb carbon oxides ($CO_X$) from a gas flow into a solvent of a solvent flow to produce a treated gas flow;

a regenerator configured to strip the carbon oxides from the solvent flow to produce a captured carbon oxides flow;
a wash system configured to wash the treated gas flow using water; and
an appendix stripper system configured to separate an outflow stream into a reclaimed amine stream and a waste stream, wherein the appendix stripper system is fluidly coupled to and receives the outflow stream at least partially from a $CO_X$ rich solvent flow path from the absorber to the regenerator, the $CO_X$ rich solvent flow path exits the absorber downstream from one or more absorption sections in the absorber, the outflow stream comprises the solvent and degraded components of the solvent, and the waste stream has a greater concentration of the degraded components than in the reclaimed amine stream.

2. The system of claim 1, wherein the appendix stripper system comprises:
an appendix stripper, wherein the appendix stripper is configured to separate the reclaimed amine stream from the waste stream; and
a reboiler, wherein the reboiler is configured to provide heat to the appendix stripper to separate the degraded components from the solvent.

3. The system of claim 1, wherein the degraded components comprise methylamine, dimethylamine, ethyl amine, diethylamine, formaldehyde, acetaldehyde, acetone, ethers, or a combination thereof.

4. The system of claim 1, wherein the appendix stripper system is fluidly coupled to and receives the outflow stream at least partially from a COX lean solvent flow path of the solvent from the regenerator to the absorber.

5. The system of claim 1, wherein the appendix stripper system is fluidly coupled to the $CO_X$ rich solvent flow path downstream from a heat exchanger along the $CO_X$ rich solvent flow path, the heat exchanger is along a $CO_X$ lean solvent flow path of the solvent from the regenerator to the absorber, and the heat exchanger is configured to transfer heat between the $CO_X$ rich solvent flow path and the $CO_X$ lean solvent flow path.

6. The system of claim 1, wherein the appendix stripper system is fluidly coupled to and receives the outflow stream at least partially from an emissions control technology (ECT) coupled to a water wash, and the ECT is configured to separate the outflow stream and the water from a wash stream of the water wash.

7. The system of claim 1, wherein the carbon oxides in the gas flow comprises carbon dioxide, and the appendix stripper system reduces an amount of the one or more degraded components in the reclaimed amine stream circulated through a carbon dioxide ($CO_2$) capture plant having the absorber and the regenerator.

8. The system of claim 7, wherein the absorber is configured to absorb the $CO_2$ from the gas flow into the solvent flow to output a $CO_2$-rich solvent flow along the $CO_X$ rich solvent flow path and to output the treated gas flow, wherein the regenerator is configured to strip the $CO_2$ from the $CO_2$-rich solvent flow to output a $CO_2$-lean solvent flow along the $CO_X$ lean solvent flow path and to output the captured carbon oxides flow comprising the $CO_2$.

9. The system of claim 1, wherein the one or more degraded components comprises degraded amines, and the appendix stripper system is configured to remove at least equal to or greater than 50 percent of the degraded amines from the outflow stream.

10. The system of claim 9, wherein the solvent of the outflow stream comprises a cyclic amine and a degraded amine, wherein the degraded amine exhibits a lower boiling point relative to the cyclic amine.

11. A method, comprising:
absorbing carbon dioxide from a gas flow into a solvent of a solvent flow in an absorber of a solvent-based carbon capture system to produce a treated gas flow;
stripping the carbon dioxide from the solvent of the solvent flow in a regenerator of the solvent-based carbon capture system to produce a captured carbon dioxide flow;
washing the treated gas flow using water in a wash system of the solvent-based carbon capture system; and
separating an outflow stream into a reclaimed amine stream and a waste gas stream via an appendix stripper system of the solvent-based carbon capture system, wherein the appendix stripper system is fluidly coupled to and receives the outflow stream at least partially from a $CO_X$ rich solvent flow path from the absorber to the regenerator, the $CO_X$ rich solvent flow path exits the absorber downstream from one or more absorption sections in the absorber, the outflow stream comprises the solvent and degraded components of the solvent, and the waste gas stream has a greater concentration of the degraded components than in the reclaimed amine stream.

12. The method of claim 11, comprising separating a plurality of components within the outflow stream based on properties of the plurality of components, wherein the properties comprise a boiling point, a molecular weight, a solubility, or a combination thereof.

13. The method of claim 11, wherein the solvent of the outflow stream comprises cyclic amine and the degraded components of the outflow stream comprises degraded amines, wherein the degraded amines exhibit lower boiling points relative to the cyclic amine.

14. The method of claim 13, wherein the boiling point of the degraded amines is less than 60° C.

15. The method of claim 13, wherein the molecular weight of the degraded amines is less than or equal to 80 grams/mole (g/mol).

16. A system, comprising:
a controller having a processor, a memory, and instructions stored on the memory and executable by the processor to control a solvent-based carbon capture system to control:
absorbing carbon dioxide from a gas flow into a solvent of a solvent flow in an absorber of a solvent-based carbon capture system to produce a treated gas flow, wherein the solvent comprises cyclic amine;
stripping the carbon dioxide from the solvent of the solvent flow in a regenerator of the solvent-based carbon capture system to produce a captured carbon dioxide flow;
washing the treated gas flow using water in a wash system;
separating an outflow stream into a purified amine stream and a waste gas stream via an appendix stripper system, wherein the appendix stripper system is fluidly coupled to and receives the outflow stream at least partially from a $CO_2$ rich solvent flow path from the absorber to the regenerator, the $CO_2$ rich solvent flow path exits the absorber downstream from one or more absorption sections in the absorber, the outflow stream comprises the solvent having one or more components at least partially caused by degradation of the solvent, and the waste gas stream has the one or more components in a higher concentration than in the purified amine stream; and controlling a temperature of an appendix stripper of the appendix stripper system to separate the cyclic amine from the one or more components, wherein the temperature is greater than a first boiling point of the one or more components and less than a second boiling point of the cyclic amine to cause the one or more components to separate from the cyclic amine to enable removal of the one or more components via the waste gas stream.

17. The system of claim 16, wherein the temperature comprises a lower threshold temperature and an upper threshold temperature, the controller is configured to maintain the temperature of the appendix stripper system above the lower threshold temperature to increase the concentration of the cyclic amine in the purified amine stream and below the upper threshold temperature to reduce energy consumption of the appendix stripper system.

18. The system of claim 16, wherein the temperature of the appendix stripper system is less than 60° C.

19. The system of claim 16, wherein the one or more components comprise methylamine, dimethylamine, ethyl amine, diethylamine, formaldehyde, acetaldehyde, acetone, or a combination thereof.

* * * * *